US012801297B2

(12) United States Patent
Lien et al.

(10) Patent No.: US 12,801,297 B2
(45) Date of Patent: Nov. 17, 2026

(54) DYNAMIC READ RETRY VOLTAGE SEQUENCES IN A MEMORY SUBSYSTEM

(71) Applicant: Micron Technology, Inc., Boise, ID (US)

(72) Inventors: Yu-Chung Lien, San Jose, CA (US); Zhenming Zhou, San Jose, CA (US); Tomer Tzvi Eliash, Sunnyvale, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 19/255,177

(22) Filed: Jun. 30, 2025

(65) Prior Publication Data

US 2025/0328267 A1 Oct. 23, 2025

Related U.S. Application Data

(63) Continuation of application No. 18/406,687, filed on Jan. 8, 2024, now Pat. No. 12,373,116.

(60) Provisional application No. 63/481,334, filed on Jan. 24, 2023.

(51) Int. Cl.
*G06F 3/06* (2006.01)

(52) U.S. Cl.
CPC .......... *G06F 3/0625* (2013.01); *G06F 3/0634* (2013.01); *G06F 3/0659* (2013.01); *G06F 3/0679* (2013.01)

(58) Field of Classification Search
CPC .... G06F 3/0625; G06F 3/0634; G06F 3/0659; G06F 3/0679
See application file for complete search history.

(56) References Cited

U.S. PATENT DOCUMENTS

| | | | | |
|---|---|---|---|---|
| 11,586,502 | B2 * | 2/2023 | Yeap | G06F 11/0772 |
| 2016/0306694 | A1 * | 10/2016 | Tai | H03M 13/6325 |
| 2020/0135280 | A1 * | 4/2020 | Hu | G11C 29/028 |
| 2022/0374305 | A1 * | 11/2022 | Yeap | G06F 12/0246 |
| 2024/0046981 | A1 * | 2/2024 | Lien | G11C 11/4074 |
| 2024/0095115 | A1 * | 3/2024 | Sikarwar | G06F 11/076 |
| 2024/0168651 | A1 * | 5/2024 | Huang | G06F 3/0679 |

* cited by examiner

*Primary Examiner* — Sean D Rossiter
(74) *Attorney, Agent, or Firm* — NICHOLSON DE VOS WEBSTER & ELLIOTT LLP

(57) ABSTRACT

Methods, systems, and apparatuses include determining to apply a read retry operation to a portion of memory. The likelihood of a read retry timeout meeting a threshold is determined. A reverse trim setting is selected in response to determining the likelihood of the read retry timeout meets the threshold. The read retry operation is executed using the selected trim setting.

20 Claims, 5 Drawing Sheets

DYNAMIC READ RETRY VOLTAGE SEQUENCES IN A MEMORY SUBSYSTEM

CROSS-REFERENCE TO RELATED APPLICATION

The present application is a continuation of U.S. application Ser. No. 18/406,687, filed Jan. 8, 2024, which claims the benefit of U.S. Provisional Application No. 63/481,334 filed on Jan. 24, 2023, which is incorporated by reference herein in its entirety.

TECHNICAL FIELD

The present disclosure generally relates to execution of read commands in a memory subsystem, and more specifically, relates to dynamic sequences of read retry voltages.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
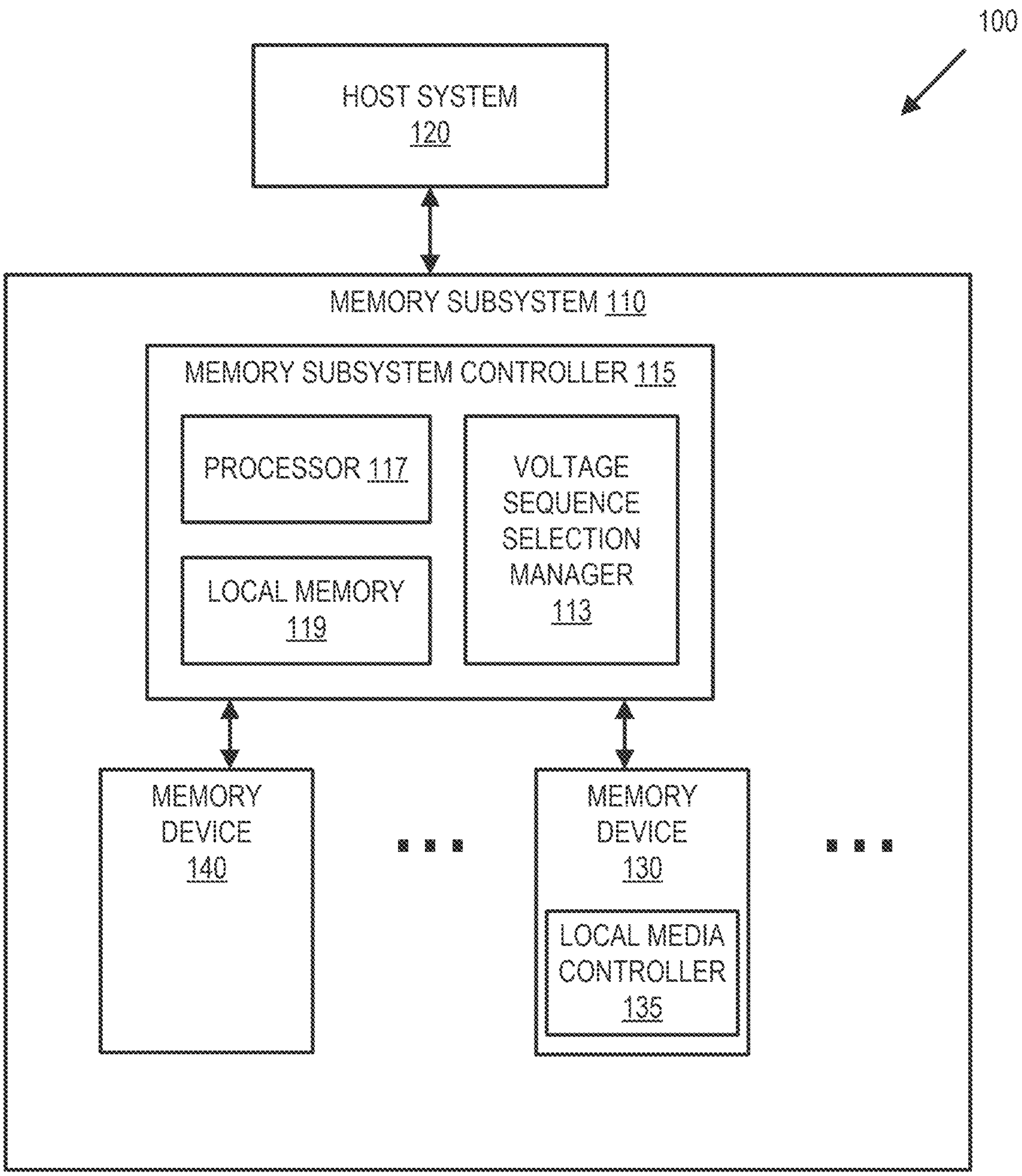
FIG. 1 illustrates an example computing system that includes a memory subsystem in accordance with some embodiments of the present disclosure.

Aspects of the present disclosure are directed to dynamic read retry voltage sequences in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states.

Memory subsystems may include internal media management processes that issue commands to read data from media or write data to media. For example, the memory subsystem may issue a read command for error mitigation. A memory system can mitigate errors via an internal process of reading the memory (i.e., performing a media or data integrity scan) and reprogramming data from one or more locations within subdivisions of memory when, e.g., an indication of error(s) for the memory location(s) reaches a threshold value.

In general, a read operation involves applying a voltage to a word line. The memory subsystem uses word lines and bit lines to access memory cells of the memory subsystem. By applying a charge to the word line, the transistor gate (e.g., a memory cell of the memory subsystem) opens, allowing any stored charge of the transistor to flow to a decoder, mapping the charge to a bit value. For example, a memory cell can represent different bit values through the application of different threshold voltage values to the transistor gate.

As described herein, a trim setting can provide voltage information, including a sequence of voltage thresholds corresponding to one or more memory cells, used to program or access the memory cells. For example, an SLC can store one of two possible bit values ("0" and "1") and each of two different threshold voltages can be applied to the gate of the transistor in a read operation. The threshold voltage results in source/drain conduction indicating the current state of the bit value. Similarly, MLC, TLC, QLC, and PLC memory represent more than two possible bit values and have a corresponding additional number of different threshold voltage values used in a read operation to determine the current bit values. Applying an increasing sequence of threshold voltages to the word line is considered a "forward read operation." That is, the forward read operation is performed on lower threshold voltage states of a word line before higher threshold voltage states of the word line. Applying a decreasing sequence of threshold voltages to the word line is considered a "reverse read operation." That is, the reverse read operation is performed on higher threshold voltage states of a word line before lower threshold voltage states of the word line. Both forward read operations and reverse read operations are associated with advantages and disadvantages. For example, reverse read operations are faster than forward read operations. However, forward read operations are more power efficient than reverse read operations.

When a read operation in a memory subsystem fails, memory subsystems may use a read retry operation (e.g., a corrective read) to attempt to read the designated portion of memory again. Conventionally, a memory subsystem cannot send data to a host device while conducting the read retry operation. Memory subsystems with inefficient read retry operations therefore suffer from reduced system performance.

Aspects of the present disclosure address the above and other deficiencies by dynamically selecting a read retry voltage sequence and corresponding trim settings based on the likelihood of a read retry timeout. For example, the memory subsystem can prioritize speed when a timeout is likely, improving system performance, while taking advantage of power efficiency when speed is a lower priority. As a result of the memory subsystem dynamically selecting the read retry voltage sequence, the performance of the memory subsystem is improved by balancing read retry latency and power consumption.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a voltage sequence selection manager 113 that dynamically determines a read retry voltage sequence to apply to one or more wordlines. In some embodiments, the controller 115 includes at least a portion of the voltage sequence selection manager 113. For example, the controller 115 can include a processing device 117 configured to execute instructions stored in local memory 119 for performing the operations described herein. In some embodiments, a voltage sequence selection manager 113 is part of the host system 120, an application, or an operating system.

The voltage sequence selection manager 113 determines a read retry voltage sequence to apply to one or more wordlines based on system information such as time and power requirements. Further details with regards to the operations of the voltage sequence selection manager 113 are described below.

Figure 2:
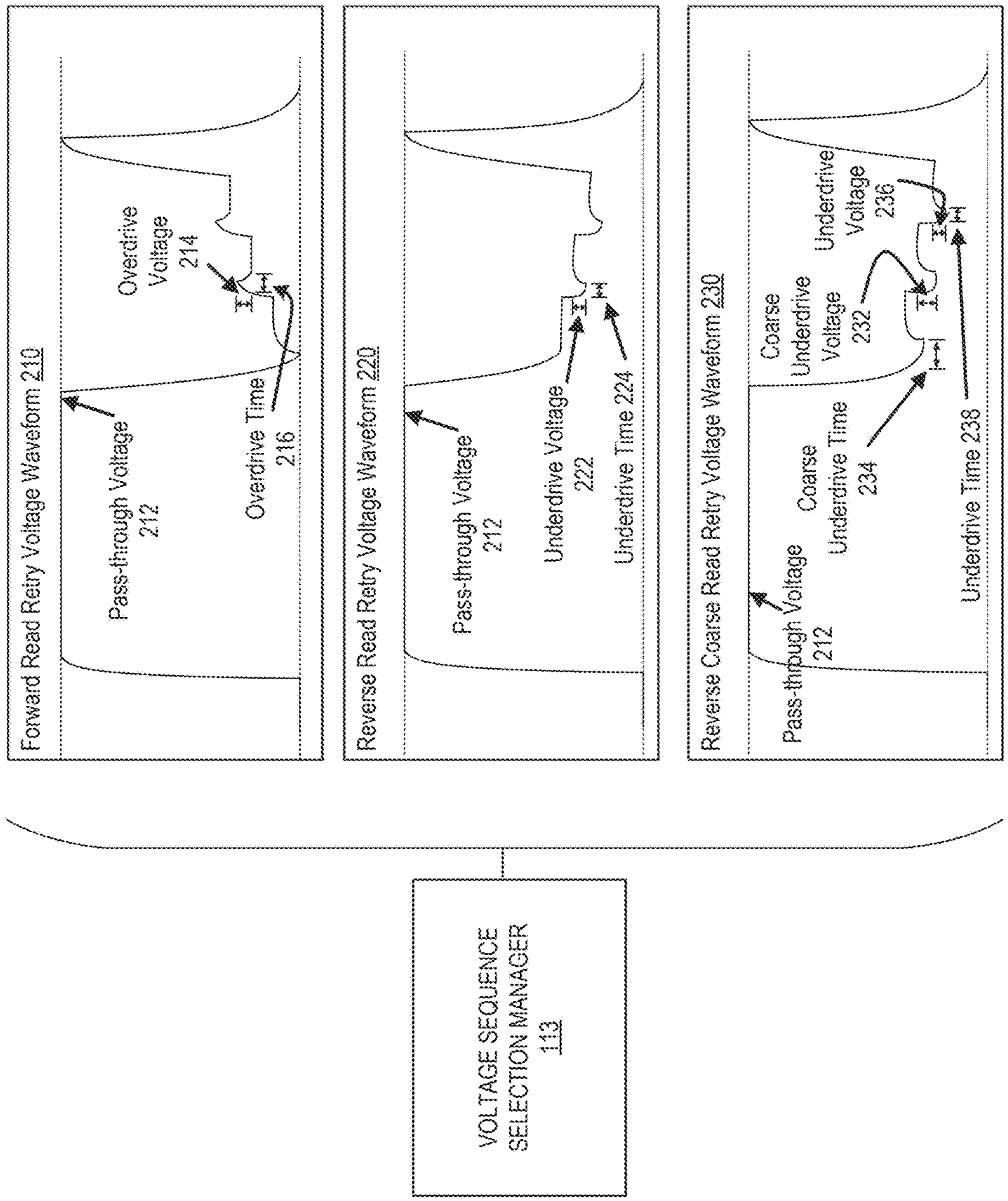
FIG. 2 illustrates exemplary read retry voltage waveforms in accordance with some embodiments of the present disclosure.

FIG. 2 illustrates exemplary read retry voltage waveforms in accordance with some embodiments of the present disclosure. Voltage sequence selection manager 113 determines a read retry trim setting in response to a read error. For example, voltage sequence selection manager 113 dynamically selects a type of read retry when an initial read of a portion of a memory device, such as memory device 140 of FIG. 1, fails (such as when a read of a portion of memory exhibits a high bit error rate).

Voltage sequence selection manager 113 determines whether to enter read error handling based on the result of a default read operation. For example, a host device (e.g., host system 120) sends a read operation to a memory subsystem (e.g., memory subsystem 110) to read a memory device (e.g., memory device 140). Voltage sequence selection manager 113 determines to enter read error handling if the read operation received by the host device, when executed by the memory subsystem, results in an unsuccessful read operation. A read operation is considered unsuccessful if a bit error rate for the portion of memory subject to the read operation satisfies an error rate threshold. For example, voltage sequence selection manager 113 determines that the read operation exhibits a raw bit error rate which satisfies the error rate threshold and enters the memory device into read error handling, which includes a read retry.

In some embodiments, read error handling includes a read retry trim setting selection stage and a read retry execution stage, among other stages. For example, during read retry trim setting selection, voltage sequence selection manager 113 selects read retry voltage waveforms for the problematic portion of memory. In some embodiments, voltage sequence selection manager 113 selects a read retry trim settings based on a number of factors, which may include read temperature, the likelihood of a read retry timeout, and/or whether the memory device is in a power savings mode, among others.

In the read retry execution stage, the voltage sequence selection manager 113 executes the read retry operation on the problematic portion of memory using the read retry trim setting. In some embodiments, the read retry operation is a forward read retry operation (e.g., execution of an increasing sequence of voltage thresholds). For example, voltage sequence selection manager 113 executes forward read retry voltage waveform 210 with overdrive voltage 214 and overdrive time 216. In other embodiments, the read retry operation is a reverse read retry operation (e.g., execution of a decreasing sequence of voltage thresholds). For example, voltage sequence selection manager 113 executes reverse read retry voltage waveform 220 with underdrive voltage 222 and underdrive time 224. In other embodiments, the read retry operation is a coarse read retry operation (e.g., execution of decreasing sequence of voltage thresholds with coarse read applied during coarse underdrive time. For example, voltage sequence selection manager 113 executes reverse coarse read retry voltage waveform 230 with coarse underdrive voltage 232, coarse underdrive time 234, underdrive voltage 236 and underdrive time 238. Voltage sequence selection manager 113 applies a coarse read during coarse underdrive time 234.

During the read retry operation, voltage sequence selection manager 113 compares each voltage threshold in the sequence of voltage thresholds to the voltage value of the cell to determine whether the voltage value is greater than or less than the voltage threshold. For example, an SLC has two possible values (e.g., 0 or 1) and a read retry operation on an SLC uses a single threshold voltage and determines whether the value is less than the voltage threshold (e.g., belongs to group 0) or greater than the voltage threshold (e.g., belongs to group 1). A QLC, however, has sixteen possible values (e.g., 0000 through 1111) and a read retry operation on a QLC uses fifteen threshold voltages (e.g., sixteen minus one) to determine the group of the cell and therefore the value of that cell.

In some embodiments, as shown in FIG. 2, voltage sequence selection manager 113 selects and executes voltage waveforms for a corrective read operation. A corrective read operation is a read retry operation that uses voltage threshold information from the execution of voltage waveforms for neighboring wordlines (e.g., wordlines N+1 and/or N−1) to determine voltage thresholds to apply during execution of the voltage waveform for the current wordline (e.g., wordline N). For example, during a corrective read operation, voltage sequence selection manager 113 executes a read operation (e.g., sequence of voltage thresholds) on wordline N+1 and determines a group for each of the cells of wordline N+1 relative to voltage thresholds (e.g., group 0 if below voltage threshold and group 1 if above). Voltage sequence selection manager 113 subsequently executes a read operation (e.g., sequence of voltage thresholds) on wordline N using values for the sequence of voltage thresholds based on the determined group of the cells of wordline N+1. For example, voltage sequence selection manager 113 increases the values of voltage thresholds for cells in group 0 and/or decreases the values of voltage thresholds for cells in group 1.

The corrective read operation can be a one-sided corrective read operation or a two-sided corrective read operation. For example, a one-sided corrective read operation uses values for the sequence of voltage thresholds based on groups determined for a single neighboring wordline (e.g., wordline N+1 or wordline N−1). A two-sided corrective read operation, however, uses values for the sequence of voltage threshold based on groups determined for neighboring wordlines on both sides (e.g., wordline N−1 and wordline N+1). Additionally, the corrective read operation can be a one-bit corrective read operation, a two-bit corrective read operation, a four-bit corrective read operation, and so on. For example, a two-sided, two-bit corrective read uses four groups (two groups from wordline N+1 and two groups from wordline N−1) to determine the voltage thresholds for wordline N.

In some embodiments, read error handling includes an automatic read calibration stage. For example, voltage sequence selection manager 113 executes an automatic read calibration (ARC) on the problematic portion of memory. In some embodiments, voltage sequence selection manager 113 executes an automatic read calibration in response to a failure of the corrective read operation. In some embodiments, voltage sequence selection manager 113 executes ARC by adjusting the potential for threshold voltage applications for a selected wordline and obtaining ARC histogram information for the selected wordline. For example, voltage sequence selection manager 113 adjusts the potential for a threshold voltage by repeatedly modulating the voltage threshold by a voltage subthreshold (e.g., modulating by a sinusoid with an amplitude of the voltage subthreshold) for part or all of the voltage threshold application. Voltage sequence selection manager 113 determines multiple histograms for each voltage threshold using the voltage threshold modulated by the voltage subthreshold (e.g., voltage threshold−voltage subthreshold, voltage threshold−voltage subthreshold/2, voltage threshold+voltage subthreshold/2, and voltage threshold+voltage subthreshold). Voltage sequence selection manager 113 serially assigns subportions (e.g., pages) of the wordline into histograms counts as the modulated voltage threshold is applied. Voltage sequence selection manager 113 uses the histogram counts to determine subsequent voltage threshold applications and therefore increases the RWB for the subsequent voltage threshold applications. For embodiments where voltage sequence selection manager 113 uses a reverse read retry voltage waveform 220 or a reverse coarse read retry voltage waveform 230, voltage sequence selection manager 113 executes ARC to modulate higher voltage states before lower voltage states. In contrast, in embodiments where voltage sequence selection manager 113 uses a forward read retry voltage waveform 210, voltage sequence selection manager 113 executes ARC to modulate lower voltage states before higher voltage states.

In some embodiments, voltage sequence selection manager 113 executes an ARC variant known as pARC by applying a boost potential signal to acquire the histogram information for subportions of the selected wordline in parallel. For example, voltage sequence selection manager 113 adjusts the potential for the selected wordline by repeatedly modulating the voltage threshold by a voltage subthreshold (e.g., modulating by a sinusoid with an amplitude of the voltage subthreshold) for part or all of the voltage threshold application. Voltage sequence selection manager 113 determines multiple histograms for each voltage threshold using the voltage threshold modulated by the voltage subthreshold (e.g., voltage threshold−voltage subthreshold, voltage threshold−voltage subthreshold/2, voltage threshold+voltage subthreshold/2, and voltage threshold+voltage subthreshold). Voltage sequence selection manager 113 assigns subportions of the wordline into histograms in parallel. Voltage sequence selection manager 113 uses the histogram counts to determine subsequent voltage subthresholds for subsequent voltage threshold applications and therefore increases the RWB for the subsequent voltage threshold applications. For embodiments where voltage sequence selection manager 113 uses a reverse read retry voltage waveform 220 or a reverse coarse read retry voltage waveform 230, voltage sequence selection manager 113 executes pARC to modulate higher voltage states before lower voltage states. In contrast, in embodiments where voltage sequence selection manager 113 uses a forward read retry voltage waveform 210, voltage sequence selection manager 113 executes pARC to modulate lower voltage states before higher voltage states.

FIG. 2 illustrates exemplary read retry voltage waveforms including forward read retry voltage waveform 210, reverse read retry voltage waveform 220, and reverse coarse read retry voltage waveform 230. As shown in forward read retry voltage waveform 210, a forward read retry waveform includes pass-through voltage 212, overdrive voltage 214, and overdrive time 216. Pass-through voltage 212 is a relatively high voltage (when compared to the subsequent threshold voltages) applied to a portion of memory before the sequence of voltage thresholds. During the read retry execution stage, voltage sequence selection manager 113 applies pass-through voltage 212 to the memory device to preemptively drain the electrons from the channel for a more accurate read operation result.

As shown in forward read retry voltage waveform 210, overdrive voltage 214 is the difference between the highest voltage applied preceding the application of voltage threshold and the voltage threshold itself (excluding the application of pass-through voltage 212). Overdrive voltage 214, therefore, measures the amount of voltage overshoot preceding a voltage threshold. Overdrive time 216 is the amount of time the voltage exceeds the following voltage threshold.

As shown in reverse read retry voltage waveform 220, a reverse read retry waveform includes pass-through voltage 212, underdrive voltage 222, and underdrive time 224. Underdrive voltage 222 is the difference between the lowest voltage applied preceding the application of a voltage threshold and the voltage threshold itself. Underdrive voltage 222, therefore, measures the amount of voltage undershoot preceding a voltage threshold. Underdrive time 224 is the amount of time the voltage is less than the following voltage threshold.

Voltage sequence selection manager 113 applies overdrive voltage 214 or underdrive voltage 222 to speed up the ramping time for parts of the portions of memory that are farther away from the voltage application source. For example, voltage sequence selection manager 113 applies forward read retry voltage waveform 210 or reverse read retry voltage waveform 220 to a wordline N. Certain portions of wordline N are physically farther away from the voltage application source and the overdrive time 216 or underdrive time 224 between subsequent applications of voltage thresholds allows for voltage stabilization for the entire wordline N.

In some embodiments, the voltage sequence selection manager 113 performs a coarse read operation. For example, voltage sequence selection manager 113 executes reverse coarse read retry voltage waveform 230.

As shown in reverse coarse read retry voltage waveform 230, coarse underdrive voltage 232 is the difference between the lowest voltage applied preceding the application of voltage threshold and the voltage threshold itself for voltage thresholds where voltage sequence selection manager executes a coarse read. For example, in some embodiments, voltage sequence selection manager 113 applies the coarse read operation for some but not all the voltage thresholds. For example, the further along in the sequence of voltage thresholds, the less benefit is received from the coarse read operation. Voltage sequence selection manager 113 may therefore only execute a coarse read operation for the first two or three voltage thresholds in the sequence.

Coarse underdrive voltage 232 measures the amount of voltage undershoot preceding the coarse read voltage thresholds. Coarse underdrive time 234 is the amount of time the voltage exceeds the following voltage threshold. In some embodiments, as illustrated in reverse coarse read retry voltage waveform 230, coarse underdrive voltage 232 is greater than underdrive voltage 236. Similarly, in some embodiments, coarse underdrive time 234 is longer than underdrive time 238.

Voltage sequence selection manager 113 executes a coarse read operation during coarse underdrive time 234. For example, voltage sequence selection manager 113 compares the values of cells in the portion of memory to coarse underdrive voltage 232 during coarse underdrive time 234. Voltage sequence selection manager 113 therefore assesses which cells are below the coarse underdrive voltage 232 during coarse underdrive time 234 and does not apply the subsequent threshold voltage to cells with values below coarse underdrive voltage 232.

In some embodiments, underdrive voltage 222 of reverse read retry voltage waveform 220 is less than the coarse underdrive voltage 232 of reverse coarse read retry voltage waveform 230. In some embodiments, coarse underdrive time 234 of reverse coarse read retry voltage waveform 230 is longer than underdrive time 224 of reverse read retry voltage waveform 220.

Figure 3:
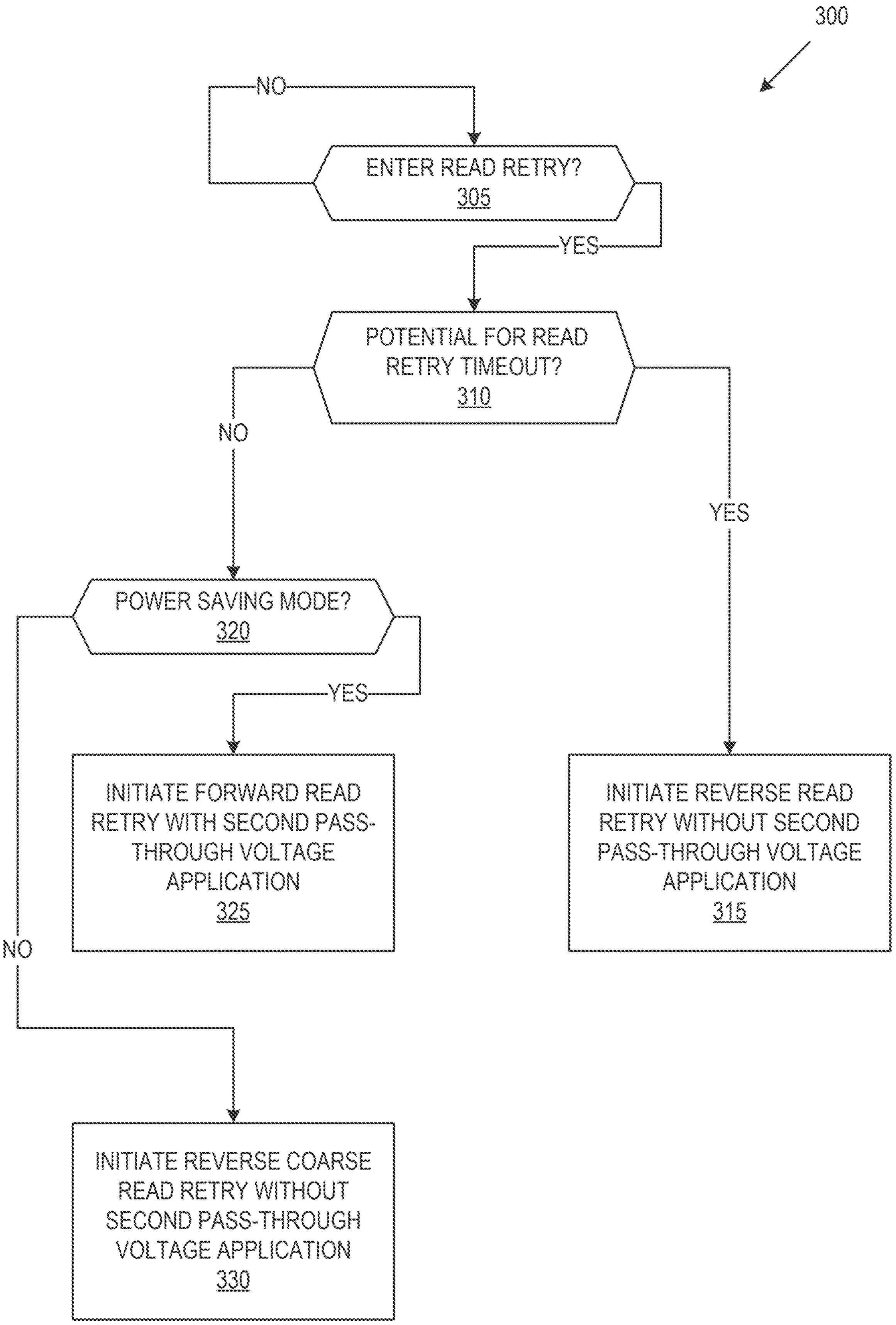
FIG. 3 is a flow diagram of an example method to manage dynamic read retry voltage sequences in accordance with some embodiments of the present disclosure.

FIG. 3 is a flow diagram of an example method 300 to manage dynamic read retry voltage sequences, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the voltage sequence selection manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device determines whether to enter a read retry state. For example, voltage sequence selection manager 113 determines whether a memory device, such as memory device 140 of FIG. 1, has failed at or otherwise had problems reading a portion of memory (such as exhibiting a high page raw bit error rate). In some embodiments, the processing device determines whether to enter read retry based on the success of a default read operation. For example, a host device (e.g., host system 120 of FIG. 1) sends a read operation to a memory subsystem (e.g., memory subsystem 110 of FIG. 1) to read a memory device (e.g., memory device 140). Voltage sequence selection manager 113 determines to enter read retry if the read operation received by the host device, when executed by the memory subsystem, results in an unsuccessful read operation. A read operation may be considered unsuccessful if a bit error rate for the portion of memory subject to the read operation satisfies an error rate threshold. For example, voltage sequence selection manager 113 determines that a read operation for a portion of memory exhibits a raw bit error rate which exceeds the error rate threshold, or otherwise is unable to correct the bit errors in data being read, and enters read retry. If the processing device determines to enter read retry, method 300 proceeds to operation 310. For example, voltage sequence selection manager 113 triggers read error handling in response to an unsuccessful read operation. If the processing device does not determine to enter read retry, method 300 returns to operation 305.

At operation 310, the processing device determines whether there is potential for a read retry timeout. For example, voltage sequence selection manager 113 determines a likelihood of a timeout during the read error handling. In some embodiments, the processing device determines the likelihood of a timeout based on a workload estimation. For example, voltage sequence selection manager 113 determines the length of a command queue (e.g., a queue of commands sent from the host system and received by the memory subsystem) and determines a workload estimation based on the length of the command queue and the contents of the command queue. In some embodiments, voltage sequence selection manager 113 determines a read retry timeout is likely when the length of the command queue satisfies a threshold length. In some embodiments, voltage sequence selection manager 113 determines a read retry timeout is likely when the number of operations of a particular type in the command queue satisfies a threshold.

In some embodiments, the processing device uses aspects of the read error handling to determine the likelihood of a timeout. For example, voltage sequence selection manager 113 determines the likelihood of a timeout using the size of the portion of memory exhibiting the high error rate, the error rate, the program erase cycles for the portion of memory, and similar aspects of the read error handling. In some embodiments, a large size of the portion of memory, a higher error rate, and higher program erase cycles results in a higher likelihood of read retry timeout.

In some embodiments, the processing device estimates a workload and a read retry time and determines whether the estimated workload and the estimated read retry time will result in a read retry timeout. For example, voltage sequence selection manager 113 estimates a read retry time for a given workload based on the number of commands in a command queue. Voltage sequence selection manager 113 determines whether the estimated read retry time satisfies a read retry timeout threshold. In some embodiments, the read retry timeout is predetermined. In other embodiments, voltage sequence selection manager 113 determines the read retry timeout based on system requirements. For example, systems with requirements that promote data validity over speed will have longer read retry timeouts. If the processing device determines that a read retry timeout is likely, the method 300 proceeds to operation 315. If the processing device determines that a read retry timeout is not likely, method 300 proceeds to operation 320.

At operation 315, the processing device initiates a reverse read retry without a second pass-through voltage application. For example, voltage sequence selection manager 113 determines a read retry trim setting with a single application of a pass-through voltage (e.g., pass-through voltage 212 of FIG. 2) followed by a decreasing sequence of voltage thresholds for each portion of memory. In some embodiments, there is a single application of the pass-through voltage before the sequence of voltage thresholds but there may be further applications of the pass-through voltage after the voltage thresholds (e.g., at the end of reverse read retry voltage waveform 220). The reverse read retry waveform may include waveforms for multiple wordlines and each wordline waveform has a single application of a pass-through voltage. In some embodiments, the processing device executes the read retry using the selected trim settings. In some embodiments, the read retry trim setting is a corrective read trim setting.

The corrective read trim settings may be for a one-sided or two-sided corrective read operation. Additionally, the corrective read operation can be a one-bit corrective read operation, a two-bit corrective read operation, a four-bit corrective read operation, and so on. For example, a two-sided, two-bit corrective read uses four groups (two groups from wordline N+1 and two groups from wordline N−1) to determine the voltage thresholds for wordline N.

At operation 320, the processing device determines whether power savings should be applied. For example, voltage sequence selection manager 113 determines whether a memory subsystem, such as memory subsystem 110 of FIG. 1 is in a power savings mode. In some embodiments, voltage sequence selection manager 113 determines whether the power level of the memory subsystem satisfies a threshold power level and determines that power savings should be applied if the power level does not satisfy the threshold power level. For example, voltage sequence selection manager 113 checks the estimate power level of a battery powering the memory subsystem. In some embodiments, the power level is received by the memory subsystem from a host device, such as host system 120 of FIG. 1. If the processing device determines that power savings should be applied, the method 300 proceeds to operation 325. If the processing device determines that power savings should not be applied, the method 300 proceeds to operation 330.

At operation 325, the processing device initiates a forward read retry without a second pass-through voltage application. For example, voltage sequence selection manager 113 selects trim settings for a forward read retry voltage waveform in response to determining the memory subsystem is in a power savings mode. The forward read retry waveform has one application of a pass-through voltage followed by a sequence of increasing voltage thresholds for each portion of memory. For example, the forward read retry waveform may include waveforms for multiple wordlines and each wordline waveform has a single application of a pass-through voltage. In some embodiments, the forward read retry voltage waveform is a corrective read voltage waveform. In some embodiments, the processing device executes the read retry using the selected trim settings.

The corrective read trim settings may be for a one-sided or two-sided corrective read operation. Additionally, the corrective read operation can be a one-bit corrective read operation, a two-bit corrective read operation, a four-bit corrective read operation, and so on. For example, a two-sided, two-bit corrective read uses four groups (two groups from wordline N+1 and two groups from wordline N−1) to determine the voltage thresholds for wordline N.

At operation 330, the processing device initiates a reverse coarse read retry without a second pass-through voltage application. For example, in response to determining the memory subsystem is not in a power savings mode, voltage sequence selection manager 113 selects a read retry trim setting with a single application of a pass-through voltage (e.g., pass-through voltage 212 of FIG. 2) followed by a decreasing sequence of voltage thresholds for each portion of memory. The processing device performs a coarse read operation during the underdrive times (e.g., underdrive time 224 of FIG. 2) of the sequence of voltage threshold applications. For example, voltage sequence selection manager 113 executes a coarse read to determine cells for the portion of memory that have values less than underdrive voltage.

In some embodiments, the underdrive voltage for the reverse coarse read retry operation is less than the underdrive voltage for a regular reverse read retry operation (e.g., a reverse read retry as described with reference to operation 315). In some embodiments, the underdrive time for the coarse read retry operation is longer than the underdrive time for a regular reverse read retry operation. In some embodiments, voltage sequence selection manager 113 applies the coarse read operation for some but not all the voltage thresholds. For example, the further along in the sequence of voltage thresholds, the less benefit is received from the coarse read operation. Voltage sequence selection manager 113 may therefore only execute a coarse read operation for the first two or three voltage thresholds in the sequence.

Figure 4:
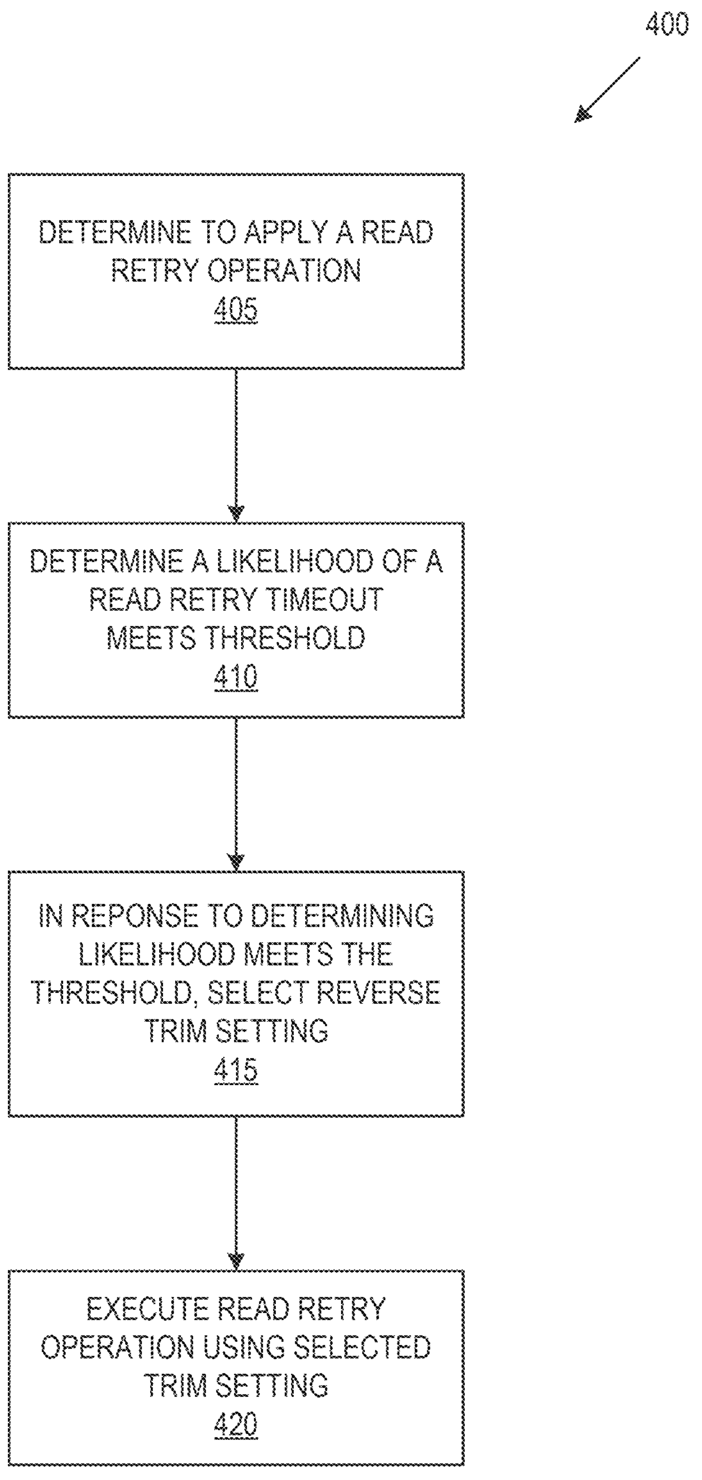
FIG. 4 is a flow diagram of another example method to manage dynamic read retry voltage sequences in accordance with some embodiments of the present disclosure.

FIG. 4 is a flow diagram of an example method 400 to manage dynamic read retry voltage sequences, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the voltage sequence selection manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device determines to apply a read retry operation. For example, voltage sequence selection manager 113 determines whether a memory device, such as memory device 140 of FIG. 1, has failed at or otherwise had problems reading a portion of memory (such as exhibiting a high page raw bit error rate). In some embodiments, the processing device determines whether to enter read retry based on the success of a default read operation. For example, a host device (e.g., host system 120 of FIG. 1) sends a read operation to a memory subsystem (e.g., memory subsystem 110 of FIG. 1) to read a memory device (e.g., memory device 140). Voltage sequence selection manager 113 determines to enter read retry if the read operation received by the host device, when executed by the memory subsystem, results in an unsuccessful read operation. A read operation may be considered unsuccessful if a bit error rate for the portion of memory subject to the read operation satisfies an error rate threshold. For example, voltage sequence selection manager 113 determines that a read operation for a portion of memory exhibits a raw bit error rate which exceeds the error rate threshold, or is otherwise unable to correct the bit errors in data being read, and enters read retry.

At operation 410, the processing device determines a likelihood of a read retry timeout meets a threshold. For example, voltage sequence selection manager 113 determines a likelihood of a timeout during the read error handling. In some embodiments, the processing device determines the likelihood of a timeout based on a workload estimation. For example, voltage sequence selection manager 113 determines the length of a command queue (e.g., a queue of commands sent from the host system and received by the memory subsystem) and determines a workload estimation based on the length of the command queue and the contents of the command queue.

In some embodiments, the processing device uses aspects of the read error handling to determine the likelihood of a timeout. For example, voltage sequence selection manager 113 determines the likelihood of a timeout using the size of the portion of memory exhibiting the high error rate, the error rate, the program erase cycles for the portion of memory, and similar aspects of the read error handling. In some embodiments, a busier workload estimation results in a higher likelihood of read retry timeout. Likewise, in some embodiments, a large size of the portion of memory, a higher error rate, and higher program erase cycles results in a higher likelihood of read retry timeout.

In some embodiments, voltage sequence selection manager 113 determines a likelihood of read retry timeout meets a threshold when the length of the command queue satisfies a threshold length. In some embodiments, voltage sequence selection manager 113 determines a likelihood of read retry timeout meets a threshold when the number of operations of a particular type in the command queue satisfies a threshold.

At operation 415, the processing device selects a reverse trim setting in response to determining the likelihood of read retry timeout meets the threshold. For example, voltage sequence selection manager 113 determines a read retry trim setting with a single application of a pass-through voltage (e.g., pass-through voltage 212 of FIG. 2) followed by a decreasing sequence of voltage thresholds for each portion of memory. In some embodiments, there is a single application of the pass-through voltage before the sequence of voltage thresholds but there may be further applications of the pass-through voltage after the voltage thresholds (e.g., at the end of reverse read retry voltage waveform 220). The reverse read retry waveform may include waveforms for multiple wordlines and each wordline waveform has a single application of a pass-through voltage. In some embodiments, the processing device executes the read retry using the selected trim settings. In some embodiments, the read retry trim setting is a corrective read trim setting.

The corrective read trim settings may be for a one-sided or two-sided corrective read operation. Additionally, the corrective read operation can be a one-bit corrective read operation, a two-bit corrective read operation, a four-bit corrective read operation, and so on. For example, a two-sided, two-bit corrective read uses four groups (two groups from wordline N+1 and two groups from wordline N−1) to determine the voltage thresholds for wordline N.

In some embodiments, the processing device selects trim settings for a coarse reverse read retry operation (e.g., reverse coarse read retry voltage waveform 230 of FIG. 2). For example, voltage sequence selection manager 113 executes a coarse read to determine cells for a portion of memory that have values less than the underdrive voltage. In some embodiments, the processing device applies the coarse read operation for some but not all of the voltage thresholds. For example, voltage sequence selection manager 113 executes a coarse read operation for the first two or three voltage thresholds in the sequence.

At operation 420, the processing device executes the read retry operation using the selected trim setting. For example, voltage sequence selection manager 113 executes the read retry operation with the selected read retry trim settings.

Figure 5:
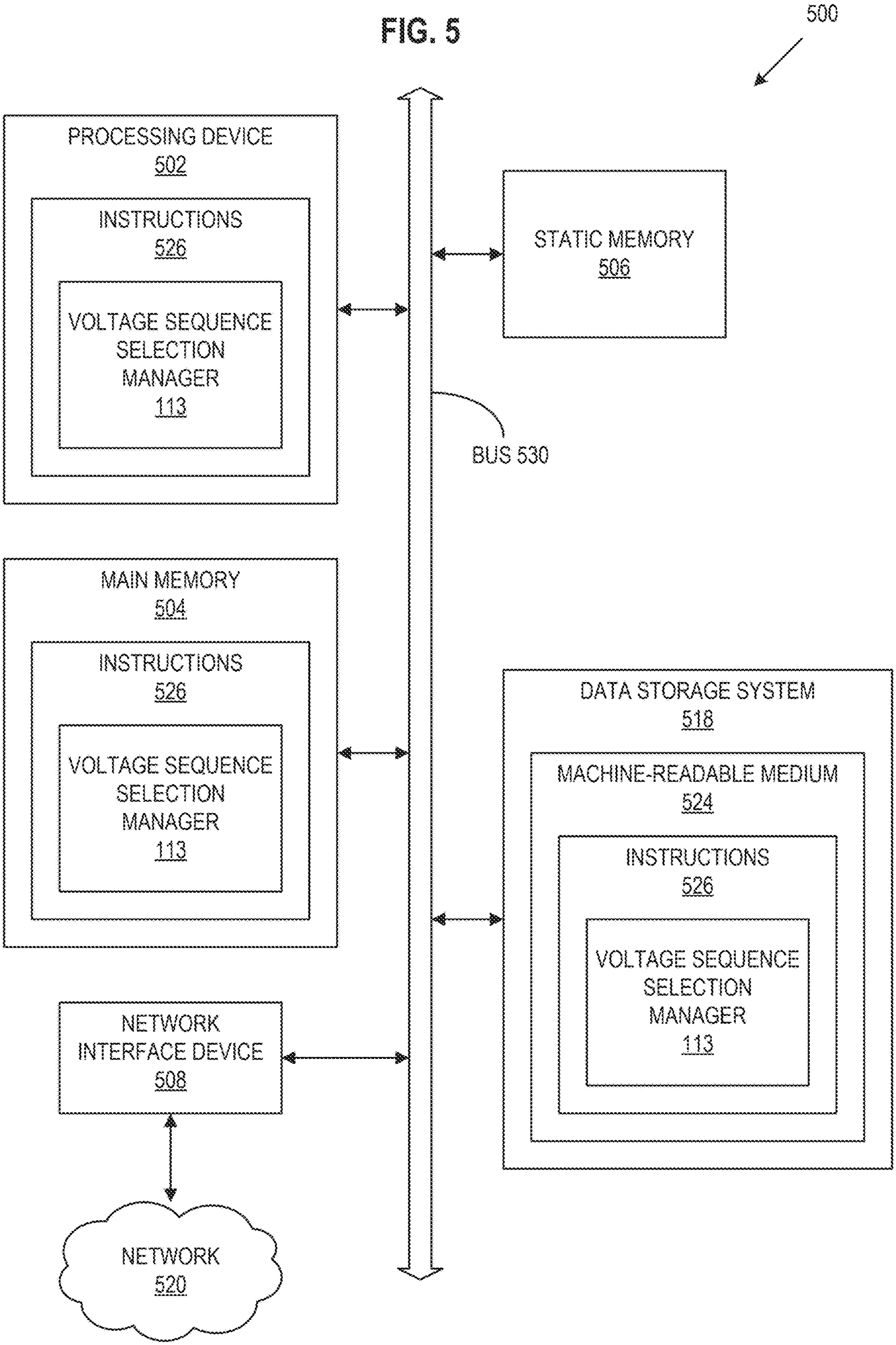
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the voltage sequence selection manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a voltage sequence selection manager (e.g., the voltage sequence selection manager 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

determining to apply a read retry operation to a portion of memory;

determining that the portion of memory is not in a power saving mode;

in response to determining the portion of memory is not in the power saving mode, selecting a reverse trim setting; and executing the read retry operation to the portion of memory using the selected trim setting.

2. The method of claim 1, wherein:

selecting the trim setting comprises retrieving the selected trim setting from a trim register configured to store at least two sets of trim settings including a regular reverse trim setting and a coarse reverse trim setting, the regular reverse trim setting comprises at least one of an underdrive voltage or an underdrive time, the coarse reverse trim setting comprises at least one of a coarse underdrive voltage or a coarse underdrive time, the coarse underdrive voltage is greater than the underdrive voltage and the coarse underdrive time is greater than the underdrive time, and the selected trim setting is the coarse reverse trim setting.

3. The method of claim 1, wherein determining that the portion of memory is not in a power saving mode is in response to determining a likelihood of read retry timeout does not meet a threshold.

4. The method of claim 1, wherein executing the read retry operation using the selected trim setting includes performing the read retry operation on higher voltage states before lower voltage states.

5. The method of claim 1, further comprising:

determining to apply a second read retry operation to a second portion of memory;

determining a likelihood of a read retry timeout for the second read retry does not meet a threshold; and in response to determining the likelihood of the read retry timeout does not meet the threshold, and that the second portion of memory is in a power saving mode, selecting a forward trim setting, wherein executing the read retry operation using the forward trim setting includes performing a read retry operation on lower voltage states before higher voltage states.

6. The method of claim 5, wherein selecting the forward trim setting comprises retrieving the forward trim setting from a trim register configured to store at least two sets of trim settings including at least one of a regular reverse trim setting, a coarse reverse trim setting, and/or the forward trim setting.

7. The method of claim 1, wherein the read retry operation includes an automatic read calibration operation.

8. A non-transitory computer-readable storage medium comprising instructions that, when executed by a processing device, cause the processing device to:

determine to apply a read retry operation to a portion of memory;

determine that the portion of memory is not in a power saving mode;

in response to determining the portion of memory is not in the power saving mode, select a reverse trim setting; and execute the read retry operation to the portion of memory using the selected trim setting.

9. The non-transitory computer-readable storage medium of claim 8, wherein:

selecting the trim setting comprises retrieving the selected trim setting from a trim register configured to store at least two sets of trim settings including a regular reverse trim setting and a coarse reverse trim setting, the regular reverse trim setting comprises at least one of an underdrive voltage or an underdrive time, the coarse reverse trim setting comprises at least one of a coarse underdrive voltage or a coarse underdrive time, the coarse underdrive voltage is greater than the underdrive voltage and the coarse underdrive time is greater than the underdrive time, and the selected trim setting is the coarse reverse trim setting.

10. The non-transitory computer-readable storage medium of claim 8, wherein determining that the portion of memory is not in a power saving mode is in response to determining a likelihood of read retry timeout does not meet a threshold.

11. The non-transitory computer-readable storage medium of claim 8, wherein executing the read retry operation using the selected trim setting includes performing the read retry operation on higher voltage states before lower voltage states.

12. The non-transitory computer-readable storage medium of claim 8, wherein the processing device is further to:

determine to apply a second read retry operation to a second portion of memory;

determine a likelihood of a read retry timeout for the second read retry does not meet a threshold; and in response to determining the likelihood of the read retry timeout does not meet the threshold, and that the second portion of memory is in a power saving mode, select a forward trim setting, wherein executing the read retry operation using the forward trim setting includes performing a read retry operation on lower voltage states before higher voltage states.

13. The non-transitory computer-readable storage medium of claim 12, wherein selecting the forward trim setting comprises retrieving the forward trim setting from a trim register configured to store at least two sets of trim settings including at least one of a regular reverse trim setting, a coarse reverse trim setting, and/or the forward trim setting.

14. The non-transitory computer-readable storage medium of claim 8, wherein the read retry operation includes an automatic read calibration operation.

15. A system comprising:

a plurality of memory devices; and a processing device, operatively coupled with the plurality of memory devices, to:

determine to apply a read retry operation to a portion of memory;

determine that the portion of memory is not in a power saving mode;

in response to determining the portion of memory is not in the power saving mode, select a reverse trim setting; and execute the read retry operation to the portion of memory using the selected trim setting.

16. The system of claim 15, wherein:

selecting the trim setting comprises retrieving the selected trim setting from a trim register configured to store at least two sets of trim settings including a regular reverse trim setting and a coarse reverse trim setting, the regular reverse trim setting comprises at least one of an underdrive voltage or an underdrive time, the coarse reverse trim setting comprises at least one of a coarse underdrive voltage or a coarse underdrive time, the coarse underdrive voltage is greater than the underdrive voltage and the coarse underdrive time is greater than the underdrive time, and the selected trim setting is the coarse reverse trim setting.

17. The system of claim 15, wherein determining that the portion of memory is not in a power saving mode is in response to determining a likelihood of read retry timeout does not meet a threshold.

18. The system of claim 15, wherein executing the read retry operation using the selected trim setting includes performing the read retry operation on higher voltage states before lower voltage states.

19. The system of claim 15, wherein the processing device is further to:

determine to apply a second read retry operation to a second portion of memory;

determine a likelihood of a read retry timeout for the second read retry does not meet a threshold; and in response to determining the likelihood of the read retry timeout does not meet the threshold, and that the second portion of memory is in a power saving mode, select a forward trim setting, wherein executing the read retry operation using the forward trim setting includes performing a read retry operation on lower voltage states before higher voltage states.

20. The system of claim 19, wherein selecting the forward trim setting comprises retrieving the forward trim setting from a trim register configured to store at least two sets of trim settings including at least one of a regular reverse trim setting, a coarse reverse trim setting, and/or the forward trim setting.

* * * * *